US011182754B2

(12) United States Patent
Rachala et al.

(10) Patent No.: US 11,182,754 B2
(45) Date of Patent: Nov. 23, 2021

(54) METHODS FOR SYNTHETIC MONITORING OF SYSTEMS

(71) Applicant: JPMorgan Chase Bank, N.A., New York, NY (US)

(72) Inventors: Karunakar Rachala, Tampa, FL (US); Hasnain Aziz, Merrick, NY (US); Hari Moorthy, West Windsor, NJ (US); Umasankar Nistala, Mumbai (IN); Michael Gillott, Hoboken, NJ (US); Bipraditya Chaudhuri, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 96 days.

(21) Appl. No.: 16/114,828

(22) Filed: Aug. 28, 2018

(65) Prior Publication Data

US 2020/0074425 A1 Mar. 5, 2020

(51) Int. Cl.
*G06Q 20/10* (2012.01)
*G06N 20/00* (2019.01)

(52) U.S. Cl.
CPC ............. *G06Q 20/10* (2013.01); *G06N 20/00* (2019.01)

(58) Field of Classification Search
CPC .............................. G06Q 20/10; G06N 20/10
See application file for complete search history.

(56) References Cited

U.S. PATENT DOCUMENTS

| 7,822,837 B1* | 10/2010 | Urban ..................... H04L 43/00 709/223 |
| 2008/0114878 A1* | 5/2008 | Gopalkrishnan ... G06F 11/3409 709/224 |
| 2009/0144409 A1* | 6/2009 | Dickerson ........... G06F 11/3495 709/224 |
| 2010/0023450 A1* | 1/2010 | Scipioni ............... G06Q 20/102 705/40 |
| 2011/0161395 A1* | 6/2011 | O'Donnell, III .... G06F 11/3414 709/203 |
| 2011/0320540 A1* | 12/2011 | Oostlander ......... G06F 11/3006 709/206 |

(Continued)

OTHER PUBLICATIONS

Sengupta and N. Banerjee, "Tracking Transaction Footprints for Non-intrusive End-to-End Monitoring," 2008 International Conference on Autonomic Computing, 2008, pp. 109-118, doi: 10.1109/ICAC.2008.14. (Year: 2008).*

*Primary Examiner* — Bruce I Ebersman
*Assistant Examiner* — Steven R Chism
(74) *Attorney, Agent, or Firm* — Greenberg Traurig LLP

(57) ABSTRACT

Methods for synthetic transaction monitoring are disclosed. In one embodiment, in an information processing apparatus comprising at least one computer processor, a method for synthetic system monitoring may include: (1) generating a synthetic transaction having a nominal value; (2) at a test interface, initiating the synthetic transaction into a transaction processing flow comprising a plurality of transaction elements; (3) the test interface receiving, from a first transaction element of the plurality of transaction elements, a first transaction state for the transaction; (4) the test interface comparing the first transaction state to a first expected transaction state for the first transaction element; and (5) the test interface generating an output based on the comparison.

14 Claims, 2 Drawing Sheets

(56) References Cited

U.S. PATENT DOCUMENTS

| | | | | |
|---|---|---|---|---|
| 2014/0074762 A1* | 3/2014 | Campbell | ............... | G06Q 40/02 |
| | | | | 706/46 |
| 2016/0103749 A1* | 4/2016 | Johns | .................. | G06F 11/3438 |
| | | | | 714/37 |
| 2016/0210215 A1* | 7/2016 | Shani | .................. | G06F 11/3495 |
| 2016/0259627 A1* | 9/2016 | Michelsen | ................ | G06F 8/35 |
| 2016/0292753 A1* | 10/2016 | Fuller | .................... | G06Q 20/10 |
| 2016/0294655 A1* | 10/2016 | Lin | ..................... | H04L 43/0882 |
| 2016/0337927 A1* | 11/2016 | Hassan | ................. | H04W 36/30 |
| 2019/0303274 A1* | 10/2019 | Funnell | ............... | G06F 16/7837 |
| 2019/0384691 A1* | 12/2019 | Kumar | ................ | G06F 11/3414 |

* cited by examiner

METHODS FOR SYNTHETIC MONITORING OF SYSTEMS

BACKGROUND OF THE INVENTION

1. Field of the Invention

Embodiments of the present invention generally relate to methods for synthetic transaction monitoring of systems.

2. Description of the Related Art

Organizations often monitor their infrastructure. For example, financial institutions may monitor transactions as they traverse systems using business activity monitoring. Current monitoring techniques, however, cannot proactively monitor critical flow functionality at any point in time.

SUMMARY OF THE INVENTION

Methods for synthetic transaction monitoring are disclosed. In one embodiment, in an information processing apparatus comprising at least one computer processor, a method for synthetic system monitoring may include: (1) generating a synthetic transaction having a nominal value; (2) at a test interface, initiating the synthetic transaction into a transaction processing flow comprising a plurality of transaction elements; (3) the test interface receiving, from a first transaction element of the plurality of transaction elements, a first transaction state for the transaction; (4) the test interface comparing the first transaction state to a first expected transaction state for the first transaction element; and (5) the test interface generating an output based on the comparison.

In one embodiment, the first transaction state may specify a time for the first transaction element to process at least a portion of the synthetic transaction.

In one embodiment, the first transaction state may be provided by a script in the first transaction element, an API, etc.

In one embodiment, the first expected transaction state may be based on machine learning from one or more past transactions processed by the first transaction element. In another embodiment, one of the past transactions may include a second synthetic transaction.

In one embodiment, the first expected transaction state may be specified in a service level agreement.

In one embodiment, the method may further include the test interface receiving, from a second transaction element of the plurality of transaction elements, a second transaction state for the transaction; and the test interface comparing the second transaction state to a second expected transaction state for the second transaction element.

In one embodiment, the output may include an end-to-end view of the synthetic transaction through the plurality of transaction elements, a status representing the first transaction state, etc.

According to another embodiment, a system for synthetic system monitoring may include a transaction processing flow having a plurality of transaction elements; and a test interface comprising at least one computer processor. The test interface may generate a synthetic transaction having a nominal value, and may initiate the synthetic transaction into a transaction processing flow comprising a plurality of transaction elements. A first transaction element of the plurality of transaction elements may process at least a portion of the synthetic transaction, and may provide a first transaction state for the transaction to the test interface. The test interface may compare the first transaction state to a first expected transaction state for the first transaction element, and may generate an output based on the comparison.

In one embodiment, the first transaction state may specify a time for the first transaction element to process at least a portion of the synthetic transaction.

In one embodiment, the first transaction element may execute a script to provide the first transaction state, may use an API to provide the first transaction state, etc.

In one embodiment, the first expected transaction state may be based on machine learning from one or more past transactions processed by the first transaction element. One of the past transactions may include a second synthetic transaction.

In one embodiment, the first expected transaction state may be specified in a service level agreement.

In one embodiment, a second transaction element of the plurality of transaction elements may process at least a second portion of the synthetic transaction, and may provide a second transaction state for the transaction to the test interface. The test interface may compare the second transaction state to a second expected transaction state for the second transaction element.

In one embodiment, the output may include an end-to-end view of the synthetic transaction through the plurality of transaction elements, a status representing the first transaction state, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Methods for synthetic transaction monitoring are disclosed.

In embodiments, critical flows are identified based on, for example, the volume, importance, dollar amounts, etc. by proactively initiating a payment transaction of a nominal value (e.g., $0.01) and monitoring the transaction as it flows through the system. This may verify that all systems are active, that transactions are being processed correctly, etc. It may also validate that the functionality and logic for processing the transaction is working properly.

In one embodiment, the process may detect performance issues within an application based on, for example, historical processing times. This may provide, for example, insights into patterns that may cause transactions not to be processed, to suffer performance degradations, etc. In one embodiment, alerts (e.g., amber, red, etc.) may be generated for the operations. These may alert, for example, a production management team to start investigating potential issues.

In embodiments, analytics and/or machine learning may be used to identify patterns and/or conditions that may cause the processing to fail, suffer performance degradations, etc.

Figure 1:
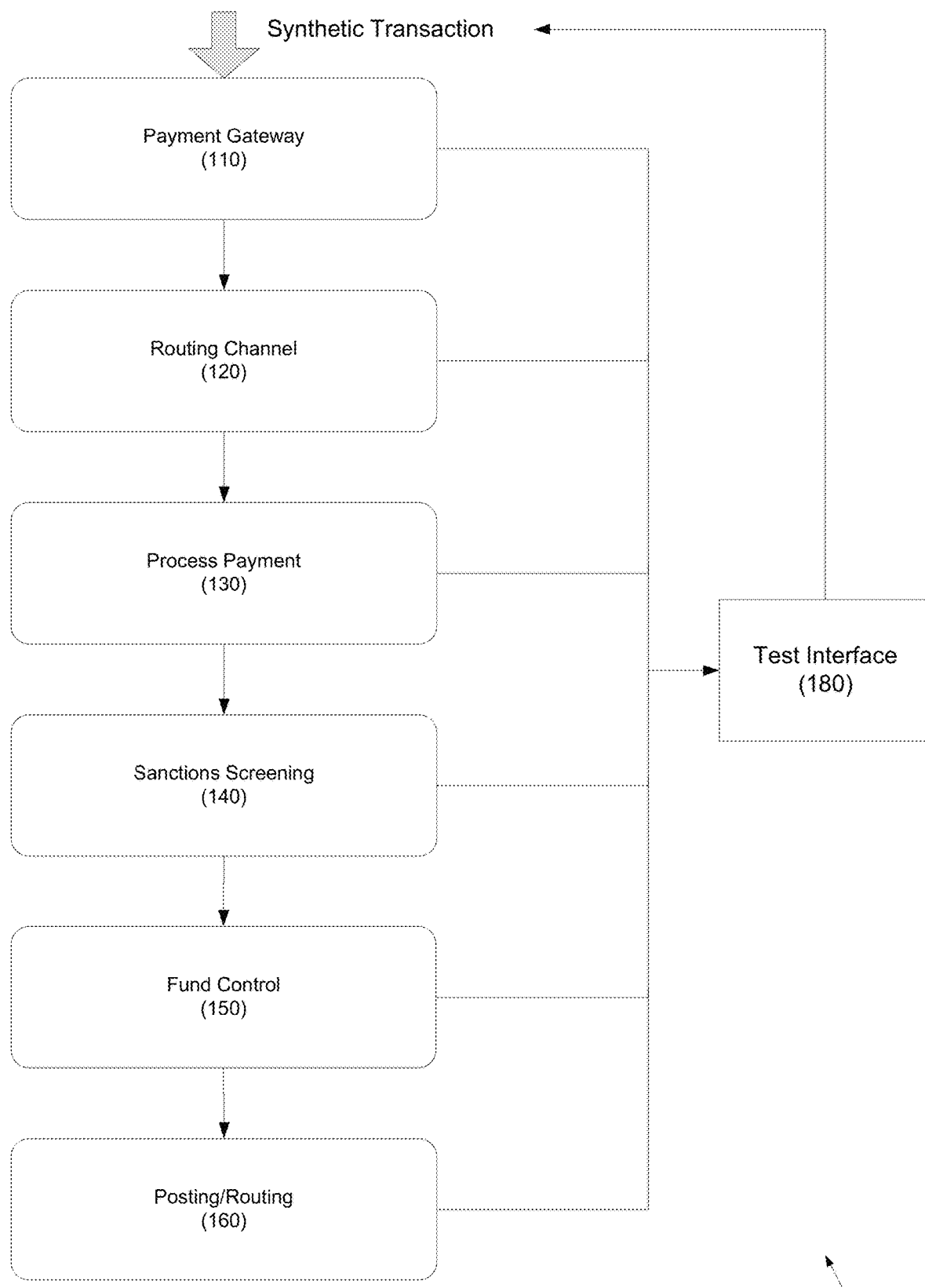
FIG. 1 depicts a block diagram illustrating a system for synthetic transaction monitoring according to one embodiment.

Referring to FIG. 1, an environment for synthetic monitoring of systems is disclosed according to one embodiment.

In one embodiment, environment 100 may include a transaction flow including, for example, elements such as payment gateway 110, routing channel 120, process payment 130, sanctions screening 140, fund control 150, and posting/routing 160. Note that these elements are exemplary only, and different and/or additional/fewer elements may be included in the transaction flow as is necessary and/or desired.

Although elements 110, 120, 130, 140, 150, and 160 are illustrated as being sequential, it should be recognized that the arrangement of these elements may be non-sequential, may employ parallelism, etc.

Test interface 180 may control the injection of a nominal synthetic transaction (e.g., a transaction having a value of $0.01) into the transaction flow. In one embodiment, test interface 180 may be any suitable computing device, and may include one or more computer processors. Test interface 180 may interface with the elements in the transaction flow so that it can monitor the flow of the synthetic transaction.

In one embodiment, the synthetic transaction may specify a source account, a destination account, an amount (e.g., $0.01), and any other transaction parameters as is necessary and/or desired.

In one embodiment, each element 110, 120, 130, 140, 150, and 160 may include a script, an API, etc., that may provide interface 180 with a status of the synthetic transaction. In one embodiment, interface 180 may include APIs or the triggering of scripts, which may include Selenium or database-based scripts. For example, when payment process element 130 receives the synthetic transaction, an embedded computer program (not shown) may send a notification to test interface 180 to inform it that element 130 has received the synthetic transaction, and a similar notification when the processing of the synthetic transaction is complete. Any other data associated with the processing of the synthetic transaction may be provided to test interface 180 as is necessary and/or desired. In one embodiment, testing results that may demonstrate success or failure, as well as alerts and/or notifications may be generated.

Test interface 180 may process the data as it is received from the elements in the transaction flow. In one embodiment, test interface 180 may receive the transaction state as is enters a transaction flow element, and as it exits a transaction flow element, and confirm that the entry state and/or the exit state are as expected. In one embodiment, test interface 180 may further receive any additional signals from the element to other transaction flow elements, other elements outside the transaction flow, etc. and compare these signals to expected signals to verify that the transaction flow element is functioning properly.

In one embodiment, test interface 180 may further monitor the time that it takes for the synthetic transaction to reach each element in the transaction flow, as well as the time that it takes the synthetic transaction to be processed by each element in the transaction flow. In one embodiment, test interface 180 may compare the time(s) to expected value(s) to determine if an element in the transaction flow is not functioning as expected.

In one embodiment, test interface 180 may use machine learning to determine whether an element, or elements, in the transaction flow are not performing as expected. The machine learning may be based on past synthetic transactions and/or past real world transactions. For example, if the time for an element to process the synthetic transaction is outside of a historical range of processing times, test interface 180 may generate an alert.

Test interface 180 may include a display (not shown) in order to display a dashboard and/or information about the progress of the synthetic transaction.

Figure 2:
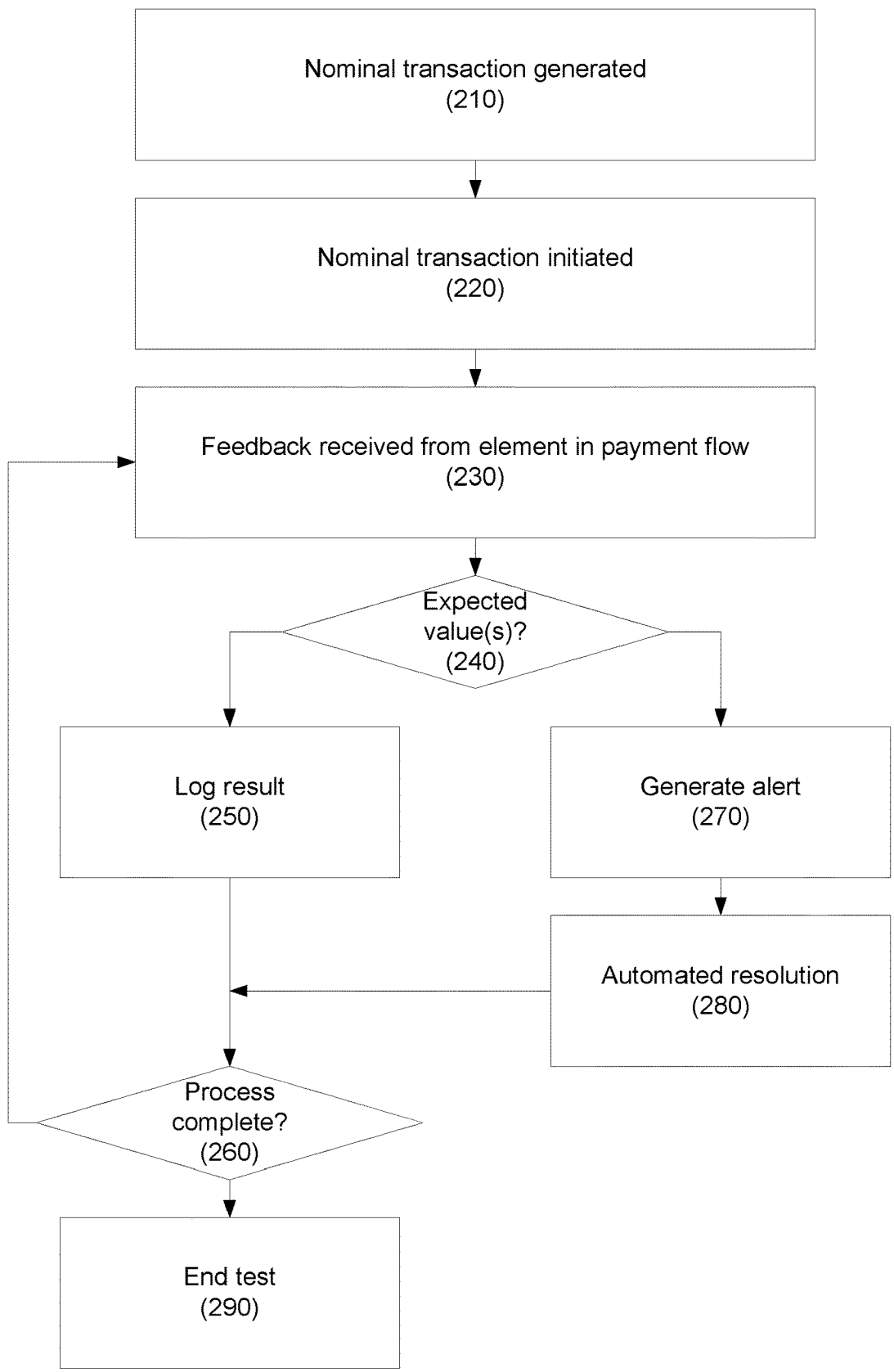
FIG. 2 illustrates a method for synthetic transaction monitoring according to one embodiment.

Referring to FIG. 2, a method for synthetic transaction monitoring of systems is disclosed according to one embodiment. In step 210, a synthetic transaction may be generated. In one embodiment, the synthetic transaction may have a nominal value (e.g., $0.01). Any suitable value may be used as is necessary and/or desired. The synthetic transaction may identify a source account, a destination account, and any other transaction parameters as is necessary and/or desired.

In one embodiment, the source account and the destination account may alternate so the value of the nominal transaction is passed back and forth between the accounts, with a minimal, if any, net change over time.

In one embodiment, the synthetic transaction may include an indicator that the transaction is a synthetic transaction. The indicator may include, for example, an account reference, an amount, etc.

In one embodiment, if a certain element in the transaction process is to be tested, the synthetic transaction may be configured to test that element. In one embodiment, a single element may be tested. This testing may take place before integration tests are conducted.

In step 220, a test interface may initiate the synthetic transaction. In one embodiment, the test interface may initiate the transaction as a normal transaction. In one embodiment, the synthetic transaction may be initiated through a script (e.g., a Selenium test script) at the payment gateway, by file transfer, SWIFT, etc.

In one embodiment, the synthetic transaction may be initiated periodically (e.g., daily), on demand, following an upgrade or hardware/software change, etc.

In step 230, the test interface may monitor the process of the synthetic transaction, and may receive feedback from the transaction flow elements as the synthetic transaction is processed. For example, scripts, APIs, etc. in each element in the transaction flow may provide status information (e.g., entry and exit times, etc.) as the synthetic transaction is processed.

In step 240, the monitored value(s) (e.g., synthetic transaction state, synthetic transaction timing, etc.) may be compared to expected value(s). If the monitored value(s) and the expected value(s) match, then the result may be logged in step 250, and, if the transaction process is not complete, the process returns to step 230. If the process is complete, the test is ended in step 290.

In one embodiment, the expected value may be based on a value specified in a service level agreement (SLA).

In one embodiment, machine learning may be used to determine the expected value(s) for the state of the synthetic transaction flow. For example, past synthetic transactions and/or past real world transactions may be used to determine the expected transaction time for each element, the expected inputs and outputs of each element, etc.

If, in step 240, the monitored value(s) do not match the expected value(s), an alert (e.g., email, text, etc.) may be generated in step 270. If there are any automated resolution procedures available, in step 280, those procedures may be applied. In one embodiment, automated procedures may be used to troubleshoot problems, apply corrective solutions, etc. For example, embodiments may leverage monitoring tools for presentation of alerts and notifications emanating out of applications within synthetic processing. These alerts and/or notifications may be automatically generated, and messages may be provided to relevant support teams.

In one embodiment, the monitored results may be presented in a dashboard. For example, indicators (e.g., high value, low value) may be displayed at each element, as may runtimes at each element, etc. In one embodiment, the dashboard may include, some or all of the following: (1) an end-to-end view of a workflow monitored; (2) a status (e.g., Red, Amber, Green (RAG)) representing application response time based on established SLA's; (3) alerts and/or notifications associated with application issues; etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS™ operating system, the OS X operating system, the ANDROID™ operating system, the Microsoft WINDOWS™ operating systems, the UNIX™ operating system, the LINUX™ operating system, the XENIX™ operating system, the IBM AIX™ operating system, the Hewlett-Packard UX™ operating system, the Novell NETWARE™ operating system, the Sun Microsystems SOLARIS™ operating system, the OS/2™ operating system, the BeOS™ operating system, the MACINTOSH™ operating system, the APACHE™ operating system, an OPENSTEP™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-implemented synthetic test monitoring method comprising:
    generating, by a computer processor, a test financial transaction from a source account to a destination account and having a nominal monetary value;
    validating, by the computer processor, an operation of a transaction processing flow comprising a plurality of transaction elements by injecting the test financial transaction into a first transaction element of the plurality of transaction elements in the transaction processing flow;
    receiving, by the computer processor, an actual transaction state from each transaction element of the plurality of transaction elements after each transaction element processes the test financial transaction;
    comparing, by the computer processor, the actual transaction state for each transaction element to an expected transaction state for the transaction element;
    generating, by the computer processor and based on the comparisons, an output comprising an end-to-end view of the test financial transaction through the transaction processing flow;
    generating, by the computer processor, a second test financial transaction from the destination account to the source account having the nominal monetary value;
    injecting, by the computer processor, the second test financial transaction into the first transaction element of the plurality of transaction elements in the transaction processing flow;

receiving, by the computer processor, a second actual transaction state from each transaction element of the plurality of transaction elements after each transaction element processes the second test financial transaction;

comparing, by the computer processor, the second actual transaction state for each transaction element to a second expected transaction state for the transaction element; and generating, by the computer processor and based on the second comparisons, a second output comprising a second end-to-end view of the test financial transaction through the transaction processing flow.

2. The method of claim 1, wherein each actual transaction state identifies a time for the transaction element to process the test financial transaction.

3. The method of claim 1, wherein each transaction element comprises a script that provides the actual transaction state.

4. The method of claim 1, wherein each transaction element comprises Application Programmable Interface (API) that provides the actual transaction state.

5. The method of claim 1, further comprising:
determining, by the computer processor, each expected transaction state based on machine learning from one or more past transactions processed by the transaction element.

6. The method of claim 1, further comprising:
receiving, by the computer processor, each expected transaction state from a service level agreement.

7. The method of claim 1, wherein the output comprises a status representing each transaction state.

8. A synthetic test monitoring system, comprising:
a transaction processing flow comprising a plurality of transaction elements;
a test interface comprising a computer processor; and
a memory comprising computer-readable instructions that when executed by the computer processor cause the test interface to:
generate a test financial transaction from a source account to a destination account and having a nominal monetary value;
validate an operation of an electronic transaction processing flow by injecting the test financial transaction into a first transaction element in the transaction processing flow;
receive, from each transaction element in the transaction processing flow, an actual transaction state for each transaction element after each transaction element processes the test financial transaction;
compare the actual transaction state for each transaction element to an expected transaction state for the transaction element;
generate, based on the comparisons, an output comprising an end-to-end view of the test financial transaction through the transaction processing flow;
generates a second test financial transaction from the destination account to the source account having the nominal value;
injects the second test financial transaction into the first transaction element of the plurality of transaction elements in the transaction processing flow;
receives a second actual transaction state from each transaction element of the plurality of transaction elements after each transaction element processes the second test financial transaction;
compares the second actual transaction state for each transaction element to a second expected transaction state for the transaction element; and
generates, based on the second comparisons, a second output comprising a second end-to-end view of the test financial transaction through the transaction processing flow.

9. The system of claim 8, wherein each actual transaction state identifies a time for the transaction element to process the test financial transaction.

10. The system of claim 8, wherein each transaction element comprises a script that provides the actual transaction state.

11. The system of claim 8, wherein each transaction element comprises an Application Programmable Interface (API) that provides the actual transaction state.

12. The system of claim 8, wherein the test interface further determines each expected transaction state based on machine learning from one or more past transactions processed by the transaction element.

13. The system of claim 8, wherein the test interface further receives each expected transaction state from a service level agreement.

14. The system of claim 8, wherein the output comprises a status representing each transaction state.

* * * * *